United States Patent

[11] 3,610,836

[72] Inventors Ryoichi Kimura
Yokohama;
Kiyomi Omatsuzawa, Kakakura-shi; Nanao Gunji, Tokyo, all of Japan

[21] Appl. No. 771,838
[22] Filed Oct. 30, 1968
[45] Patented Oct. 5, 1971
[73] Assignee Hitachi, Ltd.
Tokyo, Japan
[32] Priority Nov. 1, 1967
[33] Japan
[31] 42/69869

[54] DISTRIBUTION FRAME FOR COMMUNICATION EQUIPMENT
4 Claims, 7 Drawing Figs.

[52] U.S. Cl. .......... 179/98, 335/18
[51] Int. Cl. .......... H04q 1/16
[50] Field of Search .......... 179/98, 78, 79; 337/197, 268, 269, 113; 335/17, 18

[56] References Cited

UNITED STATES PATENTS

| | | | |
|---|---|---|---|
| 2,652,466 | 9/1953 | Mohring .......... | 337/268 |
| 3,218,413 | 11/1965 | Koch .......... | 337/197 |
| 3,375,406 | 3/1968 | Alden .......... | 179/98 |
| 3,462,558 | 8/1969 | Selz .......... | 179/98 |

*Primary Examiner*—Kathleen H. Claffy
*Assistant Examiner*—Jan S. Black
*Attorney*—Craig, Antonelli, and Hill

ABSTRACT: A distribution frame for use in communication equipment having a jack mounted on the end of each of a plurality of unit cables split from a main cable led into the distribution frame in one direction, and a jack mounted on the end of each of a plurality of unit cables split from another main cable led into the distribution frame in another direction. In the frame, the first-mentioned jack is combined with the second-mentioned jack to form a jack block, and a plug is fitted to each jack block for providing a necessary electrical connection between the main cables led into the distribution frame in the two different directions. The plugs connecting the main cables contain relays for disconnecting the cables from the exchange equipment in response to an overvoltage on the incoming cables. This relay also has a built-in fuse.

INVENTORS
RYOICHI KIMURA
KIYOMI OMATSUZAWA
NANAO GUNJI
BY
Craig & Antonelli
ATTORNEYS INVENTORS
RYOICHI KIMURA
KIYOMI OHATSUZAWA
NAHAO GUNJI
BY
Craig & Antonelli
ATTORNEYS

INVENTORS
RYOICHI KIMURA
KIYOHI OHATSUZAWA
NANAO GUNJI

BY Craig & Antonelli
ATTORNEYS

INVENTORS

RYOICHI KIMURA, KIYOMI OMATSUZAWA
AND NANAO GUNJI

BY Craig, Antonelli, Stewart & Hill
ATTORNEYS

DISTRIBUTION FRAME FOR COMMUNICATION EQUIPMENT

This invention relates to a distribution frame for use in communication equipment installed in a telephone exchange office for providing a necessary electrical connection between subscribers' lines and a switching apparatus in the office, between switching apparatuses in the office or between the switching apparatus in the office and trunk or junction cables.

Conventional distribution frames of the kind adapted for example for connecting subscribers' lines with switching apparatus in a telephone exchange office comprise terminal boards in which the subscribers' cables terminate, terminal boards in which the office cables coming from the switching apparatus terminate, and jumper wires connecting mutually the terminals of the above-described terminal boards for providing necessary electrical connection between the subscribers' lines and the switching apparatus in the office. The office cables are connected through subscribers' circuits to talking-path make-break apparatus, for example, line link frames in a crossbar switching system.

One of the important functions of the distribution frame is to average the traffic of calls arriving at each of the many line link frames. For example, in case the traffic of calls arriving at or originated by subscribers belonging to a local area A accommodated in a first frame of the many line link frames grows excessively, a portion of the subscribers belonging to the local area A are transferred to a second frame of less traffic in which subscribers belonging to a local area B are accommodated. This is generally done by transferring to the second line link frame a portion of the jumper wires connecting the subscribers' lines belonging to the local area A with the first line link frame on the distribution frame.

However, the transfer of the jumper wires has involved many defects in that the transfer work is very complex and requires a lot of time and thus the demand for calls by subscribers must be rejected for a long period of time. The conventional distribution frame structure has further been defective in that a relatively large space is occupied by the jumper wires connecting the terminal boards mutually and thereby the distribution frame has a very large size.

It is therefore a primary object of the present invention to provide a distribution frame for use in communication equipment employed for providing a necessary electrical connection between subscribers' lines and a switching apparatus in a telephone exchange office or between a switching apparatus in the office, in which means are provided so that the interconnection between the main cables led into the distribution frame from at least two different directions can easily be varied within a very short period of time.

Another object of the present invention is to provide a distribution frame of very small size so as to reduce the floor area occupied by the distribution frame in a telephone exchange office and to minimize the cost of construction thereof.

In order to attain these objects, there is provided in accordance with the present invention a distribution frame for use in communication equipment which comprises a plurality of main cables led into said distribution frame in at least two different directions, each of said main cables having its terminating end split into a plurality of unit cables, a first means forming a connector mounted on the end of each of said unit cables, the first means associated with each of the unit cables split from those main cables led in one direction being interchangeably combined with the first means associated with each of the unit cables split from those main cables led in another direction thereby constituting a multiplicity of blocks consisting of said first means, and a second means forming a connector connectable with each of said blocks, thereby to provide a necessary electrical connection between the main cables led into said distribution frame in the two different directions.

Other objects features and advantages of the present invention will be readily apparent from the following description of a preferred embodiment thereof taken in conjunction with the accompanying drawings, in which.

Figure 1:
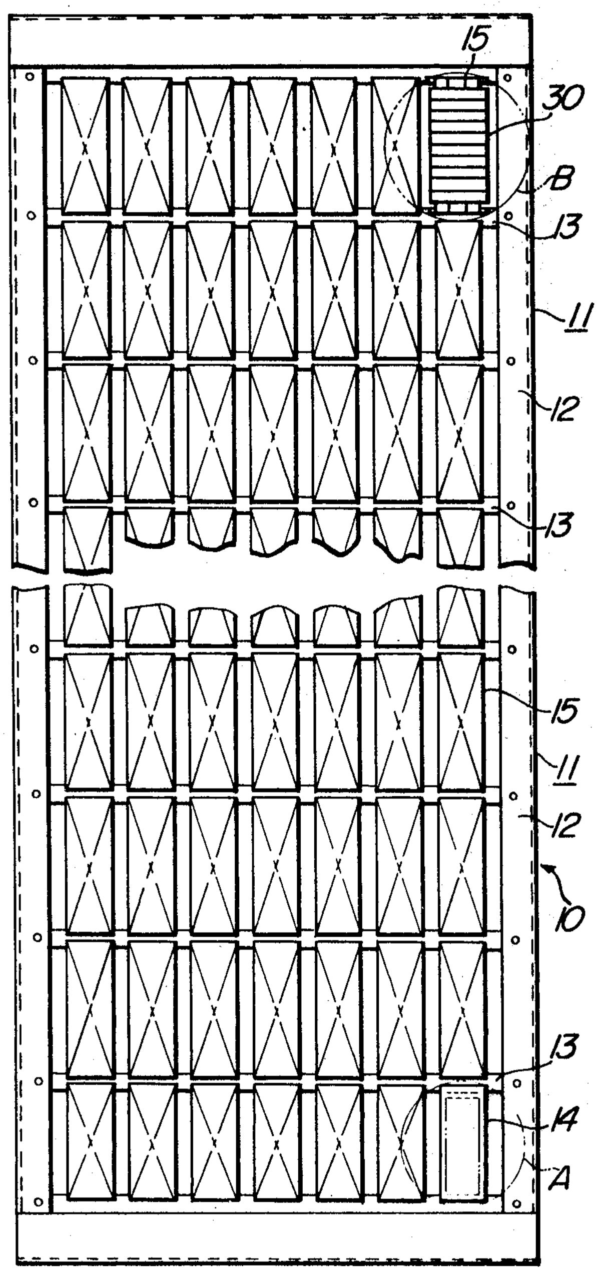
FIG. 1 is a schematic front elevational view of part of a main distribution frame for providing a necessary electrical connection between subscribers' lines and apparatus accommodating the subscribers' lines in a telephone exchange system such as a line link frame in a crossbar switching system.

Referring to FIG. 1, the main distribution frame according to the present invention is generally designated by the reference numeral 10 and comprises a frame structure 11, horizontal members 13 spanning between vertical members 12 of the frame structure 11, terminal boards 14 and jack blocks 15 mounted on the horizontal members 13, and plug structures 30 connectable with the jack blocks 15. In the main distribution frame 10, the terminal boards 14, one of which is shown in detail in a circle A, are arranged in a horizontal row at the lowermost part of the main distribution frame 10, while the jack blocks 15, one of which is shown in detail in a circle B, are arranged in a plurality of horizontal rows over the entire portions of the main distribution frame 10 except the lowermost portion at which the terminal boards 14 are disposed.

Figure 2:
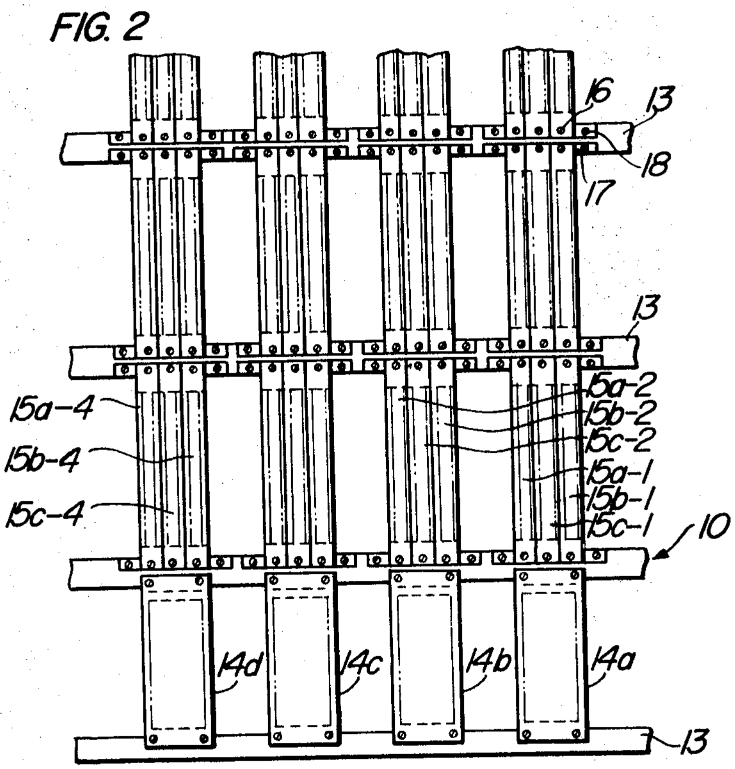
FIG. 2 is an enlarged front elevational view of part of the main distribution frame shown in FIG. 1.
Figure 3:
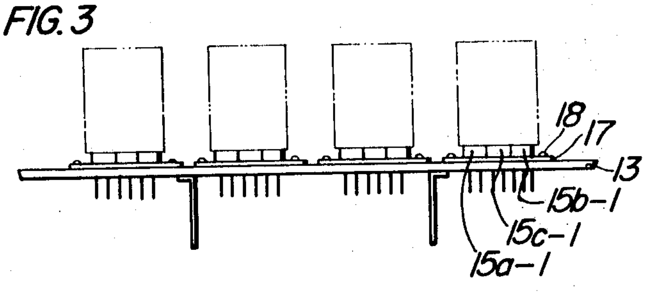
FIG. 3 is a side elevational view of part of the main distribution frame shown in FIG. 2.

Referring to FIGS. 2 and 3, each jack block 15 consists of three jacks **15*a*, 15*b* and 15*c*. These jacks 15*a*, 15*b* and 15*c* are fastened integrally to spaced brackets 17 at opposite ends thereof by screws 16, and these brackets 17 are fixed to the horizontal members 13 by screws 18** in a predetermined spaced relation.

Figure 7:
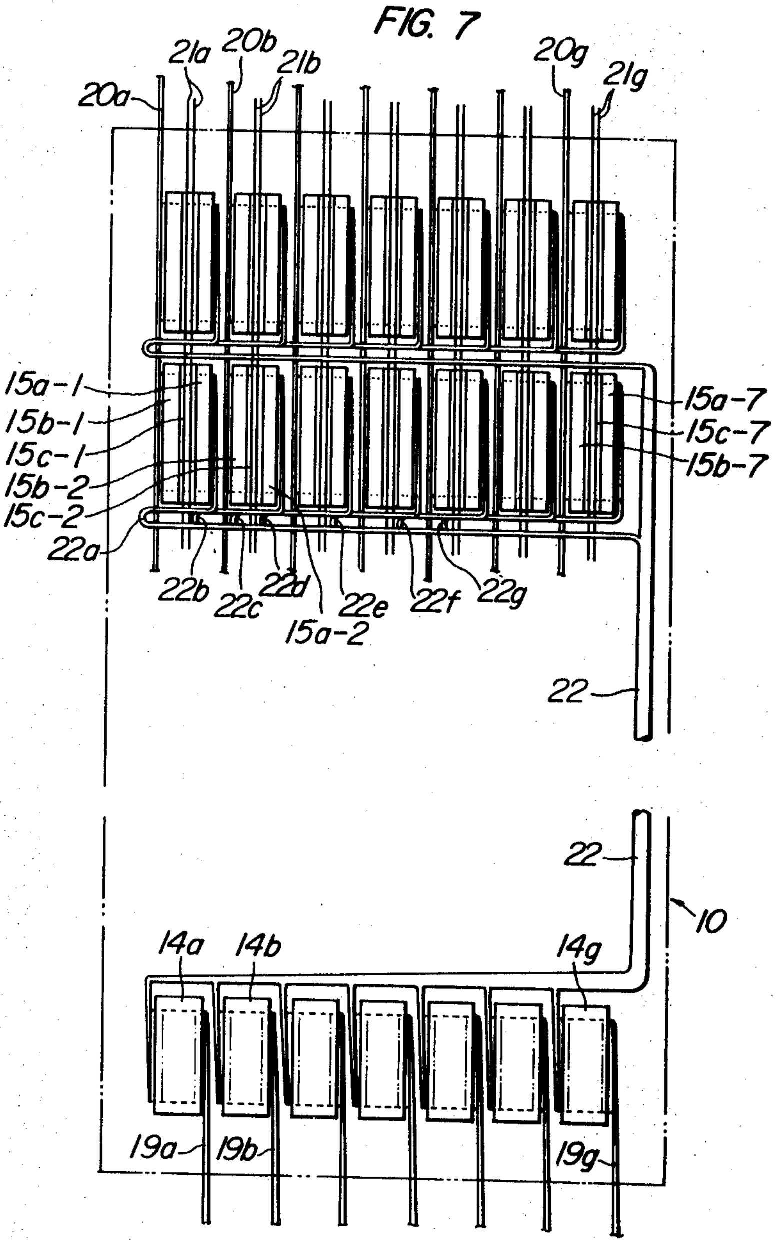
FIG. 7 is a back view of the main distribution frame with the frame member, mounting members and other members removed to clearly illustrate the state of disposition of the main cables and the jacks associated therewith.

As seen in the circle B in FIG. 1, one jack block 15 is associated with 10 plug structures 30. It will thus be known that 10 subscribers are served by the single jack block 15 for the necessary electrical connection, and the terminating end of each of the main cables led into the main distribution frame 10, that is, subscribers' cables 19 or more substantially bay cables 22 and cables 20 led to the subscriber accommodation apparatus as well as protective cables 21 in FIG. 7 is split into 10 unit cables corresponding to the 10 subscribers.

Figures 4, 5, 6:
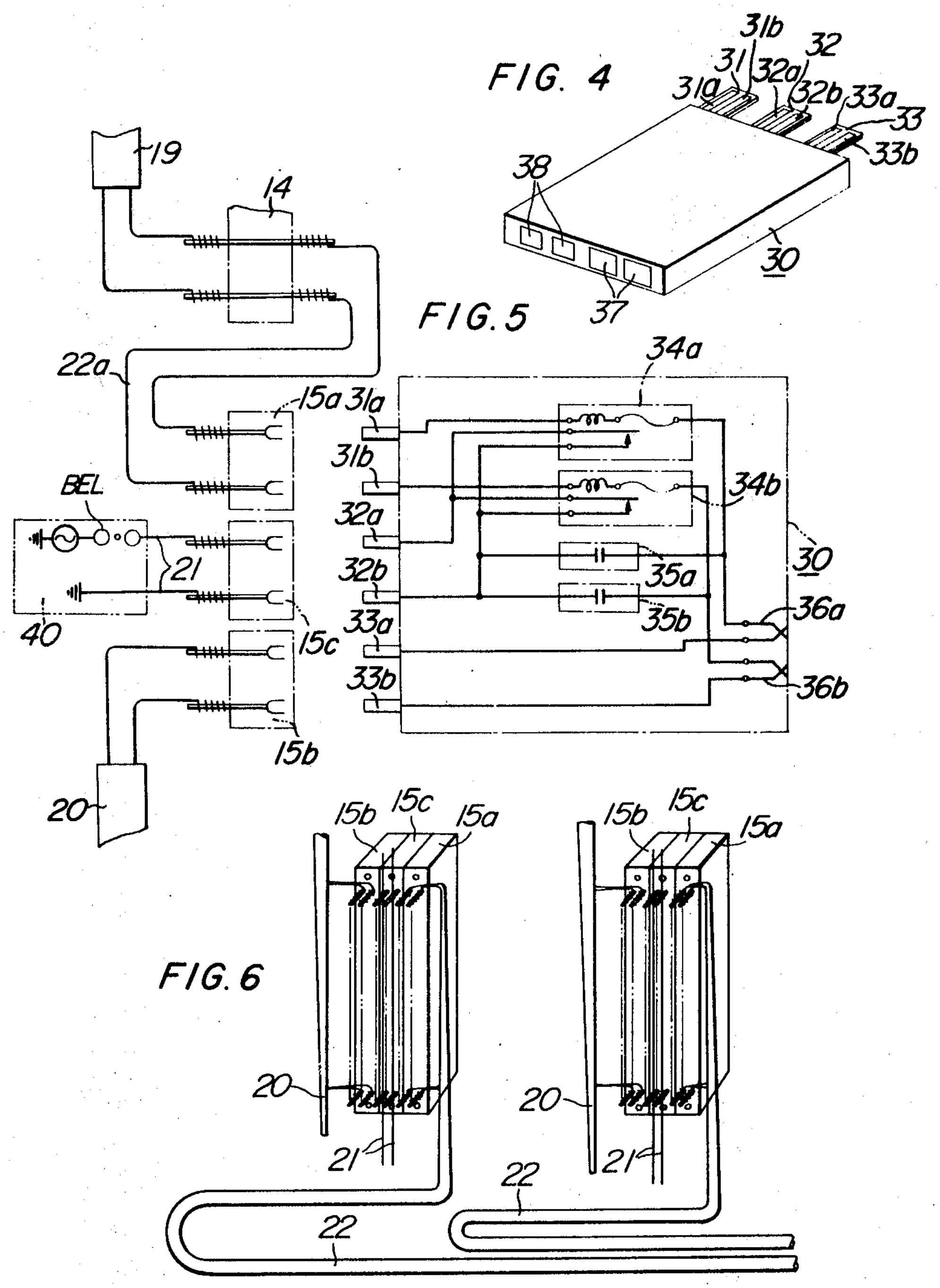
FIG. 4 is a perspective view of a plug structure connectable with jacks mounted on the end of main cables for providing a necessary electrical connection between the main cables led into the main distribution frame.
FIG. 5 is an electrical connection diagram for illustrating the manner of electrical connection between the main cables led into the main distribution frame.
FIG. 6 is a perspective view of the jacks mounted on the end of the main cables led into the main distribution frame.

Each plug structure 30 has a shape and construction as shown in FIG. 4.

The plug structure 30 is prepared for each subscriber and is provided with three terminal legs 31, 32 and 33 for insertion into the respective jacks **15*a*, 15*b* and 15*c*. The terminal legs 31, 32 and 33 are equipped with respective pairs of terminals 31*a*, 31*b*; 32*a*, 32*b*; and 33*a*, 33*b* of electrically conductive material. As seen in FIG. 5, the plug structure 30 contains therein a pair of disconnecting switches 34*a* and 34*b* with a built-in fuse, a pair of arresters 35*a* and 35*b*, and a pair of normally closed test contactors 36*a* and 36*b*. The plug structure 30 is provided with pairs of front windows 37 and 38. The front windows 37 are provided so that a plug of electrically insulating material can be inserted therethrough for opening the normally closed test contactors 36*a* and 36*b* thereby temporarily cutting off the electrical connection between the subscriber's cable 19 and the cable 20 led to the subscriber accommodation apparatus. The windows 37 are also utilized for insertion therethrough of a plug of a monitoring device. The windows 38 are provided so as to inspect therethrough whether or not the disconnecting switches 34*a* and 34*b* with a built-in fuse operate properly in response to a flow of a current higher than an allowable limit through the subscriber's cable 19** for more than a predetermined period of time.

FIG. 5 is a diagram for illustrating the electrical connection between the subscriber's cable 19, the cable 20 led to the subscriber accommodation apparatus and the protective cable 21 for each of the subscribers. When the plug structure 30 is fitted to the jack block 15, the terminals 31*a* and 31*b* on the terminal leg 31, the terminals 32*a* and 32*b* on the terminal leg 32, and the terminals 33*a* and 33*b* on the terminal leg 33 of the plug structure 30 are electrically coupled to the respective jacks 15*a*, 15*c* and 15*b*. Therefore, the subscriber's cable 19 is electrically connected in the normal state with the cable 20 by way of the path which is traced from the subscriber's cable 19—terminal board 14—bay cable 22—jack 15*a*—terminals 31*a* and 31*b* of plug structure 30—disconnecting switches 34*a* and 34*b* with built-in fuse—normally closed test contactors 36*a* and 36*b*—terminals 33*a* and 33*b*—jack 15*b* to the cable 20 led to the subscriber accommodation apparatus.

Suppose now a case in which an unusual situation occurs in the subscriber's cable 19, that is, for example, a current higher than the allowable limit flows through the subscriber's cable 19 for more than a predetermined period of time due to the fact that the subscriber's cable 19 is contacted by a power transmission line. Then, the disconnecting switch 34*a* with built-in fuse and/or the disconnecting switch 34*b* with built-in fuse are actuated to cut off the circuit including the terminals 31*a*, 31*b* and the normally closed test contactors 36*a*, 36*b*, and at the same time, establish a circuit including the terminals 32*a*, 32*b* and a protective device 40 thereby ringing a bell disposed within the protective device 40. Further, in case an unusually high impulse voltage is applied to the subscriber's cable 19 due to the strike of a lightning or any other cause, discharge takes place within the arresters 35*a* and 35*b* to lead the unusually high voltage to the ground through the terminal 32*b* and the protective cable 21.

Referring to FIGS. 6 and 7, the general electrical connection between the subscriber' cables 19, the cables 20 led to the subscriber accommodation apparatus and the protective cables 21 all of which are led into the main distribution frame 10 will be described in detail.

FIG. 7 shows the backside of the main distribution frame 10 and is intended to clearly illustrate the arrangement of the jack blocks 15, the terminal boards 14 and the cables 19, 20 and 21 by placing special emphasis thereon. As will be apparent from FIG. 7, a plurality of subscribers' cables 19, a plurality of cables 20 connected to the apparatus (not shown) accommodating the subscribers' lines, and a plurality of protective cables 21 connected to the protective devices 40 (FIG. 5) are led into the main distribution frame 10 in three different directions. More precisely, the subscribers' cables 19 comprise a plurality of cables 19*a* to 19*g* classified by the local service areas. These cables 19*a* to 19*g* are connected first with respective terminal boards 14*a* to 14*g* classified by the local service areas and are then electrically connected with a bay cable 22 previously laid for connection with these terminal boards 14. For each horizontal row of the jack blocks 15, the end of the bay cable 22 is split into a plurality of unit cables 22*a* to 22*g* corresponding to the terminal boards 14*a* to 14*g*. Jacks 15*a*–1 to 15*a*–7 are mounted on the end of the respective unit cables 22*a* to 22*g*. Accordingly, the subscribers' cables 19 have their ends substantially electrically split into a plurality of unit cables and the many jacks 15*a* are mounted on the end of the unit cables. In the illustrated embodiment, all those jacks 15*a* of the jack blocks 15 which are arranged in the same horizontal row are connected with the same terminal board 14 by the bay cable 22. For example, the jacks 15*a* in the uppermost row are connected with the terminal board 14*a*, and the jacks 15*a* in the second row next to the uppermost row are connected with the terminal board 14*b*.

The cables 20 comprise a plurality of cables 20*a* to 20*g* each of which is connected with a unit of apparatus accommodating the subscribers' lines such as a line link frame in a crossbar switching system. These cables 20*a* to 20*g* having their end split into a plurality of unit cables terminating in each horizontal row of the jack blocks 15. Jacks 15*b*–1 to 15*b*–7 are mounted on the end of the respective unit cables.

The interrelation between the jacks 15*a*, 15*b* and 15*c* in FIG. 7 is such that the jacks 15*b* and 15*c* associated respectively with the cables 20*a* to 20*g* and the protective cables 21*a* to 21*g* are longitudinally arranged whereas the jacks 15*a* associated with the subscribers' cables 19*a* to 19*g* or the unit cables 22*a* to 22*g* of the bay cable 22 are laterally arranged, thereby constituting a multiplicity of jack blocks 15.

It will be understood from the description given hereinabove that, when the plug structures 30 are fitted to the jack blocks 15, the individual subscribers' cables 19*a* to 19*g* coming from the different local service areas are connected with a plurality of units of the subscriber accommodation apparatus by way of the terminal boards 14, bay cables 22*a* to 22*g*, jacks 15*a*, jacks 15*b*, and cables 20*a* to 20*g*.

The protective cables 21 comprise a plurality of cables 21*a* to 21*g* connected each with the protective device 40. These cables 21*a* to 21*g* have their end split into a plurality of unit cables terminating in each horizontal row of the jack blocks 15, and jacks 15*c*–1 to 15*c*–7 are mounted on the end of these unit cables, respectively.

In FIGS. 6 and 7, the unit cables 22*a* to 22*g* split from the bay cable 22 and having the respective jacks 15*a*–1 to 15*a*–7 mounted on the end thereof have a sufficient length so that any one of these jacks 15*a*–1 to 15*a*–7 can be mounted in any one of those jack blocks 15 which are located in the same horizontal row.

Preliminary work that may be done in the factory for constructing the main distribution frame 10 having such an arrangement includes fixing one end of the bay cable 22 to the terminal boards 14, mounting the jacks 15*a*–1 to 15*a*–7 on the end of the respective unit cables 22*a* to 22*g* split from the other end of the bay cable 22, mounting the jacks 15*b*–1 to 15*b*–7 on the end of the unit cables split from the respective cables 20*a* to 20*g* led to the corresponding units of the subscriber accommodation apparatus, and mounting the jacks 15*c*–1 to 15*c*–7 on the end of the unit cables split from the protective cables 21*a* to 21*g*. Further, work that may be done at the place of installation of the telephone exchange apparatus includes fixing the subscribers' cables 19*a* to 19*g* to the respective terminal boards 14*a* to 14*g*, securing the jacks 15*a*, 15*b* and 15*c* to the brackets 17 for forming the individual jack blocks 15, fastening the many jack blocks 15 to the horizontal members 13 of the frame structure 11, and fitting the plug structures 30 to each of these jack blocks 15. Therefore, the work that must be done at the place of installation of the telephone exchange apparatus for providing a necessary electrical connection between the cables led into the main distribution frame 10 can be completed in a time which is remarkably shorter than the time required by conventional main distribution frames, and the connecting work as such can very simply be carried out. This leads to a great advantage namely that the cost of work on the spot which occupies a relatively high percentage of all the costs required for the construction of a telephone exchange office can greatly be reduced.

Furthermore, the plug structure 20 of simple construction can readily provide a necessary electrical connection between the cables led into the main distribution frame 10. The main distribution frame 10 having the structure described above can be made very small in size compared with conventional main distribution frames in which the cables are first connected with the terminal boards and then the terminal boards are electrically connected with one another by jumper wires so as to obtain a necessary electrical connection between the cables. Thus, the floor area occupied by the main distribution frame in a telephone exchange office can greatly be reduced.

The main distribution frame 10 having the above-described structure is further advantageous in that transfer of the subscribers from one unit to another of the subscriber accommodation apparatus can be simply be effected by a rearrangement of the jacks 15*a* among the jack blocks 15 lying in the same horizontal row. When, for example, the traffic handled by the specific unit of the subscriber accommodation apparatus connected with the cable 20*a* in FIG. 7 is much higher than the traffic handled by the remaining units of the subscriber accommodation apparatus, the jack 15a–1 may be transferred to the position of the jack 15a–7, the jack 15a–7 to the position of the jack 15a–2, and the jack 15a–2 to the position of the jack 15a–1. By this manner of jack rearrangement, the traffic handled by the individual units of the subscriber accommodation apparatus connected with the cables 20a to 20g can be averaged. The rearrangement work for the main distribution frame of the present invention can be finished in a very much shorter time than the time required by the conventional main distribution frame in which the jumper wires electrically connecting the terminal boards with one another must be transferred in order to transfer the positions of the particular subscribers from one unit to another of the subscriber accommodation apparatus. Thus, the time during which a call originated by a subscriber is locked can be made very short and the subscriber can enjoy a good service.

While a preferred embodiment of the present invention has been illustrated and described in the above by way of example, it will be apparent for those skilled in the art that the present invention is no way limited to such a specific embodiment which is merely given so that those skilled in the art can completely understand the way in which the present invention is practiced in actual applications. It will be understood therefore that many changes and modifications may be made therein without departing from the spirit of the present invention so that they suit best the specific applications.

We claim:

1. A wiring distribution arrangement for use with communication equipment comprising:
- a plurality of main cables extending in two different directions and disposed within said frame, each of said main cables including a plurality of unit cables and having its end, which terminates at said frame, split into said plurality of unit cables, each of said unit cables having a connector mounted on one end thereof terminating at said frame;
- a first plurality of block sections formed by first groups of said unit cable connectors;
- a plurality of plug structures, each having a first plurality of terminals mounted thereon, for receiving said first plurality of block sections, a second plurality of terminals mounted thereon, and a first plurality of conductive paths connecting said first plurality of terminals with said second plurality of terminals;
- a plurality of terminal boards formed by second groups of said connectors mounted on said unit cables and having a third plurality of terminals mounted thereon;
- a plurality of bay cables connected at one thereof to said third plurality of terminals and having connectors mounted on the other end thereof;
- a second plurality of block sections formed by groups of said connectors mounted on said bay cables;
- whereby said main cables may be electrically connected together through the connection of said plurality of first and second block sections to said terminals mounted on said plug structures which provides an electrically conductive path therebetween, wherein each of said plug structures has a fourth plurality of terminals mounted thereon and further includes a plurality of switches disposed therein, the closure of which provides a conductive path between the terminals of said fourth plurality of terminals.

2. An arrangement according to claim 1, further including a plurality of protective cables respectively connected to a plurality of protective devices at one end thereof and to a third plurality of block sections at the other end thereof, said third plurality of block sections being formed by groups of connectors mounted on the end of said plurality of protective cables, said third plurality of block sections being connectable with said fourth plurality of terminals mounted on said plug structure, whereby, in response to the closure of said switches, a conductive path will be established between a protective device and said switches within said plug structure.

3. A wiring distribution arrangement for use with communication equipment comprising:
- a plurality of main cables extending in two different directions and disposed within said frame, each of said main cables including a plurality of unit cables and having its end, which terminates at said frame, split into said plurality of unit cables, each of said unit cables having a connector mounted on one end thereof terminating at said frame;
- a first plurality of block sections formed by first groups of said unit cable connectors;
- a plurality of plug structures, each having a first plurality of terminals mounted thereon, for receiving said first plurality of block sections, a second plurality of terminals mounted thereon, and a first plurality of conductive paths connecting said first plurality of terminals with said second plurality of terminals;
- a plurality of terminal boards formed by second groups of said connectors mounted on said unit cables and having a third plurality of terminals mounted thereon;
- a plurality of bay cables connected at one thereof to said third plurality of terminals and having connectors mounted on the other end thereof;
- a second plurality of block sections formed by groups of said connectors mounted on said bay cables;
- whereby said main cables may be electrically connected together through the connection of said plurality of fist and second block sections to said terminals mounted on said plug structures which provides an electrically conductive path therebetween, wherein said plug structures include built-in fuses disposed within said first plurality of conductive paths and further include relay windings connected in series with said fuses disposed within said first plurality of conductive paths and wherein said plurality of switches disposed within said conductive paths between said terminals of said fourth plurality of terminals are responsive to a predetermined flow of current in said relay windings, whereby electrical equipment, interconnected by said cables and said plug structure, may be protected by the actuation of said switches in response to an undesirable flow of current in said plug structure.

4. An arrangement according to claim 3, wherein said plug structure further includes a plurality of arresters connected between said conductive paths associated with said fourth plurality of terminals and said first plurality of conductive paths.